Nov. 23, 1971    J. H. BEVERIDGE    3,621,758
RECIPROCATING PISTON MACHINE
Filed June 16, 1970    11 Sheets-Sheet 1

FIG. 1.

INVENTOR.
JOHN HERBERT BEVERIDGE
BY
Warren T. Jessup
ATTORNEY

Nov. 23, 1971  J. H. BEVERIDGE  3,621,758
RECIPROCATING PISTON MACHINE
Filed June 16, 1970  11 Sheets-Sheet 2

INVENTOR.
JOHN HERBERT BEVERIDGE
BY Warren T. Jessup
ATTORNEY

Nov. 23, 1971   J. H. BEVERIDGE   3,621,758
RECIPROCATING PISTON MACHINE
Filed June 16, 1970   11 Sheets-Sheet 3

FIG. 4.

INVENTOR.
JOHN HERBERT BEVERIDGE
BY
Warren T. Jessup
ATTORNEY

FIG. 6.

Nov. 23, 1971   J. H. BEVERIDGE   3,621,758
RECIPROCATING PISTON MACHINE
Filed June 16, 1970   11 Sheets-Sheet 6

FIG. 7.

INVENTOR.
JOHN HERBERT BEVERIDGE
BY
Warren T. Jessup
ATTORNEY

Nov. 23, 1971  J. H. BEVERIDGE  3,621,758
RECIPROCATING PISTON MACHINE
Filed June 16, 1970  11 Sheets-Sheet 8

FIG. 9.

INVENTOR.
JOHN HERBERT BEVERIDGE
BY
Warren T. Jessup
ATTORNEY

Nov. 23, 1971    J. H. BEVERIDGE    3,621,758
RECIPROCATING PISTON MACHINE
Filed June 16, 1970    11 Sheets-Sheet 10

FIG. 11.

INVENTOR.
JOHN HERBERT BEVERIDGE
BY JESSUP & BEECHER
Warren T. Jessup
ATTORNEYS

United States Patent Office 3,621,758
Patented Nov. 23, 1971

3,621,758
RECIPROCATING PISTON MACHINE
John Herbert Beveridge, P.O. Box 485,
Folsom, Calif. 95630
Continuation-in-part of abandoned application Ser. No. 717,085, Mar. 29, 1968. This application June 16, 1970, Ser. No. 46,713
Int. Cl. F01b *15/06;* F02b *59/00, 33/04*
U.S. Cl. 91—176                                                2 Claims

ABSTRACT OF THE DISCLOSURE

A reciprocating piston-pivotally oscillating cylinder internal combustion machine is provided in which the components are designed and constructed in a manner so as to increase the aspirating capacity per cycle of the machine, and in which a simple and effective means is provided for closing the cylinder exhaust port independently of the piston reciprocating motion relative to the cylinder so as to retain in the cylinder a large portion of the aspirated charge.

---

This invention relates to reciprocating piston machines in which the piston, the oscillating cylinder, the crank shaft and the crankcase form the elements of an oscillating vane machine.

This is a continuation-in-part of co-pending application Ser. No. 717,085, filed Mar. 29, 1968 and now abandone.

An object of this invention is the design construction and arrangement of components of a reciprocating piston machine in such a manner as to increase the aspirating or breathing capacity per cycle to a breathing capacity substantially in excess of the volumetric displacement of the piston per cycle and to provide simple and effective means for closing the cylinder outlet flow passage or cylinder-block port independently of the piston reciprocating motion relative to the cylinder so as to retain in the working cylinder a large portion of the air or charge aspirated.

It is another object of this invention to achieve the above-mentioned increase in breathing capacity and retention capability without the use of auxiliary equipment, without materially increasing the number of moving parts and without materially affecting the weight, size and cost. For conventional reciprocating piston machines, the maximum power output is proportional to the maximum breathing capacity per cycle and the maximum number of cycles per unit time. The maximum breathing capacity per cycle is proportionate to the volumetric displacement of the piston per cycle, whereas the maximum number of cycles per unit time a machine is capable of depends primarily on the relative weight, mechanical strength and load-carrying ability of the reciprocating components of the machine.

In substantially all present-day reciprocating piston machines, a crankshaft and a connecting rod are used to transmit power to or away from the piston from outside the machine. Since the crankshaft and surrounding structure are inherent in reciprocating piston machines, it would be desirable to have these components function in such a manner that they effectively increase the breathing capacity per cycle of a machine having a given volumetric piston displacement. In addition, it would be desirable to reduce the reciprocating weight to an absolute minimum without compromising the load-carrying ability of the piston.

In crankcase scavenged two-cycle internal combustion engines, the volumetric displacement of the piston with respect to the crankcase induces the new charge for each cycle. In this type of reciprocating piston machine, it is unlikely that the volume of charge handled per cycle is greater than the volumetric displacement of the piston relative to the crankcase.

Some internal combustion engines are superchanged to effectively increase the breathing capacity per cycle; however, this requires auxiliary equipment which is generally expensive, complicated and often unreliable.

Mechanically simple forms of two-cycle internal combustion engines utilize ports in the lower cylinder walls which are opened and closed by the piston movement relative to the cylinder. The resulting symmetrical exhaust port timing resulting from the piston controlled porting places a severe limitation on the amount of fresh charge which can be retained within the cylinder. In recent years, a great amount of development has been done on tuned exhaust systems. A tuned exhaust pipe creates a dynamic over-pressure at the cylinder outlet just prior to closure of the exhaust port, thus acting as a fluid dynamic valve tending to prevent outflow of cylinder fluid. Unfortunately, such exhaust systems are usually noisy and function effectively only over a very limited range of engine speed. It would be very desirable to provide non-symmetrical exhaust port timing provided it could be accomplished without significantly increasing the mechanical complexity of the machine.

In a previous similar Pat. 2,844,131, for reciprocating piston machines, a reciprocating piston machine was disclosed in which the connecting rod, the piston, the crankshaft and the crankcase functioned as a crankcase compressor with displacement per cycle in excess of the piston displacement. Unfortunately, the weight of the connecting rod and piston are somewhat greater than conventional corresponding parts and the sealing requirements of the connecting rod relative to the piston increased the relative cost of manufacture. These factors were not sufficiently offset by the increased breathing capacity per cycle because of the inability of the cylinder with the simple piston controlled exhaust port to retain the additional air or charge and thereby provide an additional increment of power.

In the invention disclosed herein, these shortcomings have been eliminated and other desirable features inherent in the basic configuration make this form of reciprocating piston machine uniquely desirable. For example, the clearance volume including transfer passage volume can be relatively small in comparison with the swept volume thereby enhancing the volumetric and thermodynamic efficiency of the crankcase compressor. The elimination of the leakage paths between the piston and connecting rod also improves the performance of the crankcase compressor.

Another inherent desirable feature is the elimination of the piston pin and bearing, thus significantly reducing the weight of the reciprocating element and resulting inertia forces. By eliminating the piston pin bearing, the lubrication problems inherent with piston pin bearings in two-stroke cycle engines are bypassed. Concurrently, the crankpin bearing may be totally enclosed. Thus, conventional oil or grease lubrication is appropriate. Separation of the crankpin bearing lubrication system from the remainder of the crankcase internal volume is particularly desirable for a machine which utilizes the crankcase as an air compressor or expander.

Another feature inherent in the basic configuration of this invention is the improved balance even for single-cylinder engines. Improved balance is possible because the reciprocating weight and corresponding inertia forces are lessened, and the inertia force created by the oscillating cylinder is approximately 90° out of phase with the reciprocating inertia force. Thus, rotating counterweights on the crankshaft opposite the crankpin can do an outstanding job of balancing. Improved balance is especially important in very high-speed, single-cylinder reciprocating piston machines of low overall weight. The single-cylinder form of reciprocating piston machine is very important in commercial applications such as hand-held, engine-driven chain saws. Unbalanced forces cause vibrations which can be phsyically harmful to operators.

The unsymmetrical exhaust port timing which may be accomplished with the piston-controlled cylinder ports and the oscillating cylinder cylinder-block ports provides simple and effective means for retention of the fluid pumped into the upper cylinder volume. This feature is important from the standpoint of specific power output and fuel consumption.

In the previous form of crankcase-pumped, two-stroke cycle engines, the fuel consumption was unreasonably high. The additional fuel and mixture was effective for internal cooling of the piston and cylinder, but the drawback was excessively high-specific fuel consumption.

The unique features of this invention makes attractive the use of the crankcase components for more complete expansion of the original fluid within the cylinder. When the crankcase voulmetric displacement is used for the further expansion of the gases within the cylinder volume, the total displacement of a given engine is increased by several hundred percent without increasing the physical size of the original reciprocating piston machine. The features which make the use of the crankcase expansion attractive are the very small clearance volume, the very small transfer passage volume, the small leakage path length, provision for sealing means and the provision for lubrication of the crankpin bearing separated from the working fluid volumes of the crankcase. In applications such as vapor expansion (steam) engines, the temperature of the final expansion gases is so low that cooling problems are not present. For more complete expansion internal combustion engines, cooling must be provided to the cylinder sleeve which extends into the crankcase. Heat removed from the sleeve also provides cooling for the piston.

The more complete expansion feature is particularly desirable for improving the specific fuel consumption of piston engines and for greatly reducing the exhaust system noise normally associated with piston engines. The greatly reduced noise results from the approximately atmospheric pressure release of exhaust gases. Reduction of engine noise combined with improved specific fuel consumption are very desirable improvements.

For extremely high-speed engine applications, it is desirable to reduce the polar moment of inertia of the oscillating cylinder to a minimum. The open-end oscillating cylinder has significantly reduced mass and polar moment of inertia in comparison with the oscillating cylinder which has an attached cylinder head. The open-end oscillating cylinder is provided with sealing means to the fixed cylinder head to prevent leakage of high-pressure working fluid. Another feature of the open cylinder, fixed cylinder head design is that conventional valve-in-head, spark plug and fuel injection installations are conventional in that they are mounted in a non-oscillating cylinder head. Also, the gas pressure load on the trunnion bearings may be significantly reduced because the cylinder area on which the high-pressure gas acts may be only a small fraction of the corresponding piston area.

The valve-in-head arrangement is also applicable to four-cycle internal combustion engines, wherein the crankcase pump is used as a supercharger or as a more complete expansion device.

The open-end cylinder with fixed cylinder head is appropriate for a two-cycle internal combustion engine. The oscillating cylinder may be used to provide non-symmetrical exhaust port timing.

In accomplishing these and other objects, I have provided details of structure, exemplary forms of which are illustrated in the accompanying drawings wherein.

Figure 1:
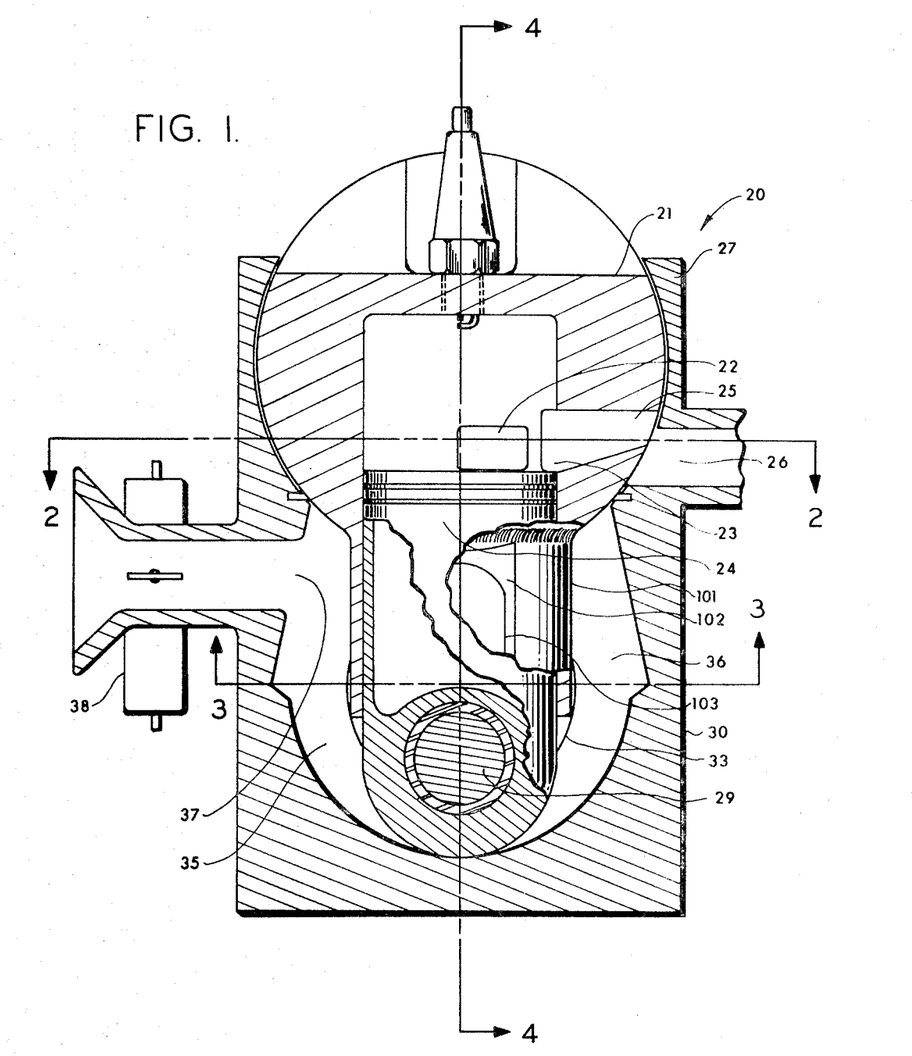
FIG. 1 is a longitudinal section, a single-cylinder, two-cycle internal combustion engine in a plane perpendicular to the axis of the crankshaft and through the axis of the cylinder.
Figure 2:
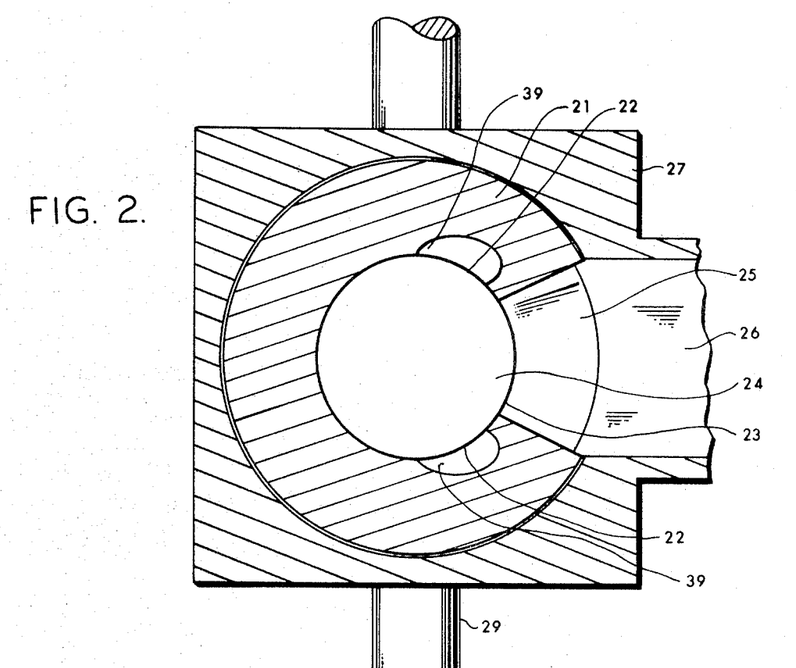
FIG. 2 is a section on line 2—2 of FIG. 1.
Figure 3:
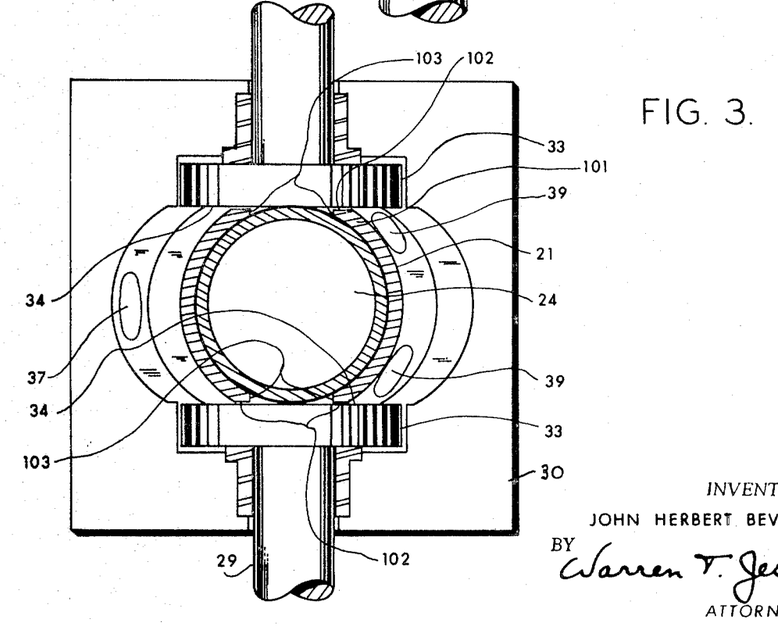
FIG. 3 is a section on line 3—3 of FIG. 1.
Figure 4:
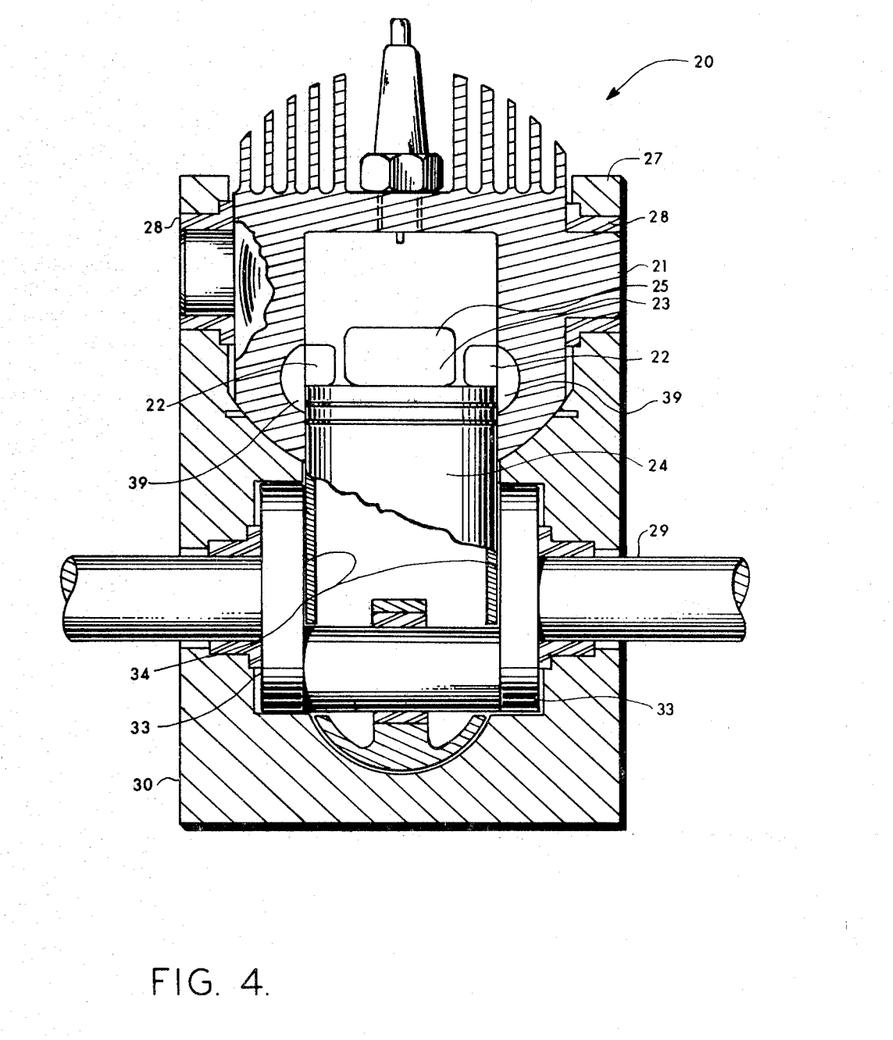
FIG. 4 is a section on line 4—4 of FIG. 1.

In FIGS. 1, 2, 3 and 4, there is shown an embodiment of a two-cycle internal combustion engine designated generally as 20. The engine 20 comprises a cylinder 21, having inlet ports 22 and exhaust ports 23 which are periodically opened and closed by the reciprocating motion of the piston 24. In addition, the cylinder 21 has a short, small-volume exhaust passage 25 which is periodically opened and closed to the exhaust system 26 by the oscillation motion of the cylinder relative to the cylinder block 27. The cylinder 21 is pivotally mounted in trunnion bearings 28. The oscillation motion of the cylinder 21 is induced by the piston 24 which is pivotally attached to the crankshaft 29. The crankshaft 29, rotatably mounted within the lower portion of the cylinder block or crankcase 30 has full circular webs or discs 33 which have their inner faces or surfaces 34 machined so they are aligned with the bore of the cylinder at its maximum dimensions in the planes perpendicular to the axis of the crankshaft. The peripheries of the webs are machined to allow no more than a close clearance in the crankcase portion of the cylinder block. The crankshaft turns in a counter-clockwise direction (FIG. 1).

The cylinder sleeve extension 101 extends into the crankcase. The extension 101 has flats or reliefs 102 to prevent interference with the side walls of the crankcase and with the inner faces 34 of the crankshaft webs 33. Also, the cylinder sleeve extension 101 is slotted 103 to prevent interference with the crankpin portion of the crankshaft.

The piston 24, pivotally mounted to the crankshaft, forms a close clearance relative to the adjacent or inner surfaces of the crankshaft webs 34. The piston 24 also forms a close clearance relative to the inner surfaces of the crankcase 30 during a portion of each revolution of the crankshaft 29. Thus, there is formed partition means, including the piston 24, said partition means divides the crankchamber or interior of the crankcase into two mutually isolated compartments or chambers during a portion of each revolution of the crankshaft. One chamber, 35, is on the left-hand side of the piston 24 and one chamber, 36, is on the right-hand side of the piston 24.

The crankcase 30 is provided with a charge suction port or crankcase port 37. In communication with the crankcase port 37 is carburetor 38. Transfer passages 39 extend between the interior of the crankcase or crankchamber 36 and the cylinder inlet ports 22.

In operation, when the piston 24 is at the top of its stroke, the entire crankchamber, or interior of the crankcase, is in communication with crankcase port 37. This condition exists during the downstroke of the piston until the lower portion of the piston forms a close clearance with respect to the interior surface of the crankcase below the crankcase port 37. At this point, the piston divides the interior of the crankchamber into two chambers or two compartments. One chamber, designated 35, is associated with the crankcase port 37 and the other chamber, designated 36, is associated with the transfer passages 39. This condition is maintained until the crankshaft 29 and the piston 24 reach a predetermined position, which is usually just after the closure of the cylinder inlet ports 22 by the piston 24.

It is apparent that during the downstroke of the piston, after it has passed the crankcase port 37 and formed a close clearance with respect to the interior surface of the crankchamber, the chamber 35 associated with the crankcase suction port 37 is increasing in volume and the chamber 36 associated with or in communication with the transfer passages 39 is continuously decreasing in volume. The continuously changing volumes of the two chambers 35 and 36 produce the pumping or compressing action of the crankcase compressor.

The cylinder blowdown process occurs during the interval after the opening of the cylinder exhaust port 23 and prior to in-flow of crankcase pumped fluid which occurs after the opening of the cylinder inlet ports 22. During blowdown, most of the exhaust products leave the cylinder volume above the piston via the exhaust passage 25, which is in open communication with the exhaust system 26.

The cylinder scavenging process commences after blowdown. Charge compressed in the chamber 36 flows through the transfer passages 39 and cylinder inlet ports 22, thereby scavenging the interior of the cylinder above the piston. Near the completion of the scavenging process, the exhaust passage 25 is closed off from the exhaust system 26 by the oscillating motion of the cylinder 21. This occurs when the piston is near bottom dead center and the angular velocity of the cylinder 21 is near its maximum speed. The chamber 36 in communication with the transfer passages 39, i.e. the crankcase compressor clearance volume continues to decrease in volume after bottom dead center and after closure of the exhaust passage even though the piston has started its upstroke. Thus, charge continues to flow from the crankchamber 36 into the cylinder chamber until the piston closes off the cylinder inlet ports 22. The crankcase compressor is particularly effective in this configuration because of the relatively small clearance volume in the crankcase and short, small volume transfer passages 39.

Also, the closing off of the exhaust passage before the piston has ascended significantly in the cylinder assures retention of the fresh charge, thereby enhancing power output and fuel-air consumption. Some compression of fluid in the relatively small volume of the exhaust passage 25 occurs. This is why it is desirable to close it off just prior to completion of the scavenging process.

After the closure of the cylinder inlet ports 22, the close clearance between the pston and interior of the crankcase is opened and the pumping cycle is concluded. The suction of fresh fluid into the crankcase may continue until the piston has reached and passes top dead center.

By proper choice of the bore of the cylinder, the stroke of the piston, the internal volume of the crankchamber and the timing of the closure of the exhaust passage, the desired scavenging charge and supercharge of the cylinder may be obtained.

Figure 5:
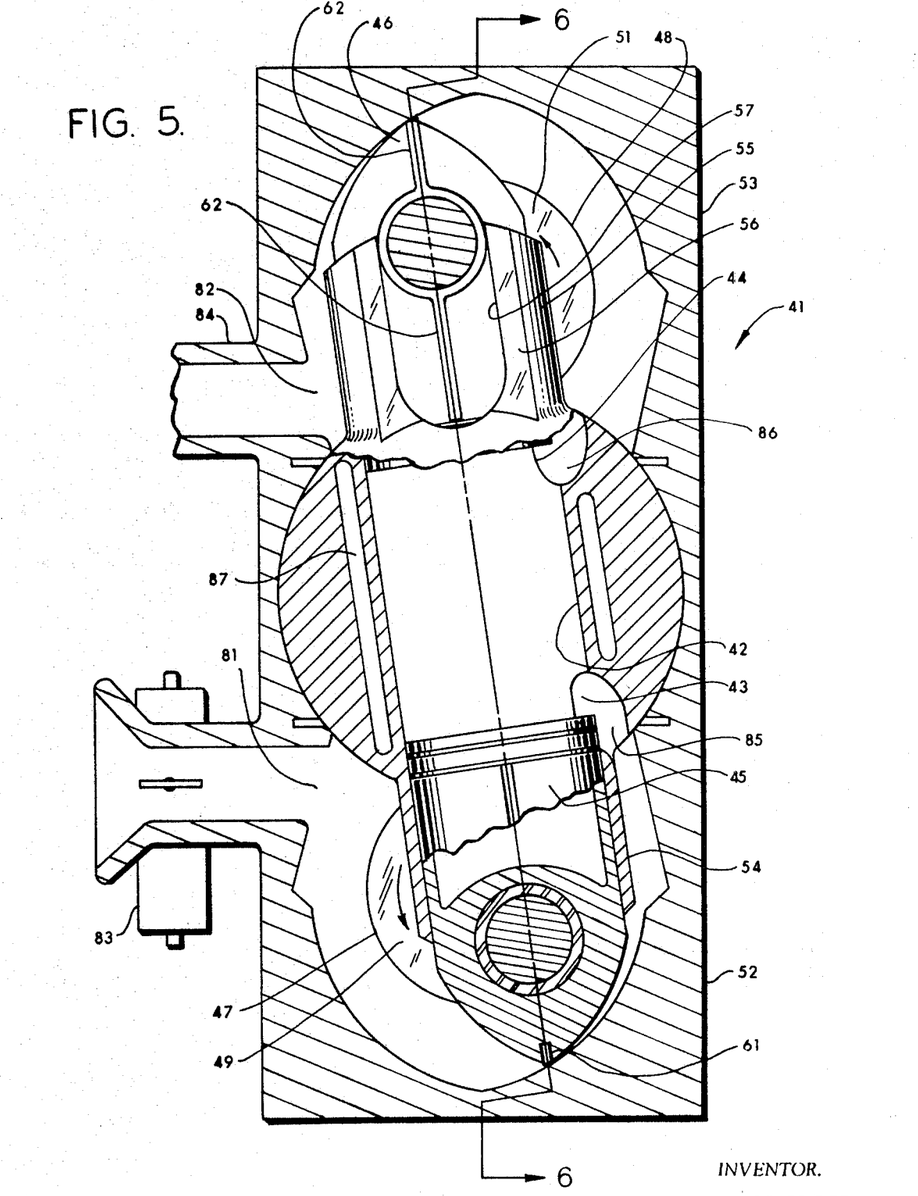
FIG. 5 is a longitudinal section of a second form of the invention showing a single-cylinder, opposed piston, two-cycle internal combustion engine in a plane perpendicular to the axis of the crankshafts and through the axis of the cylinder.
Figure 6:
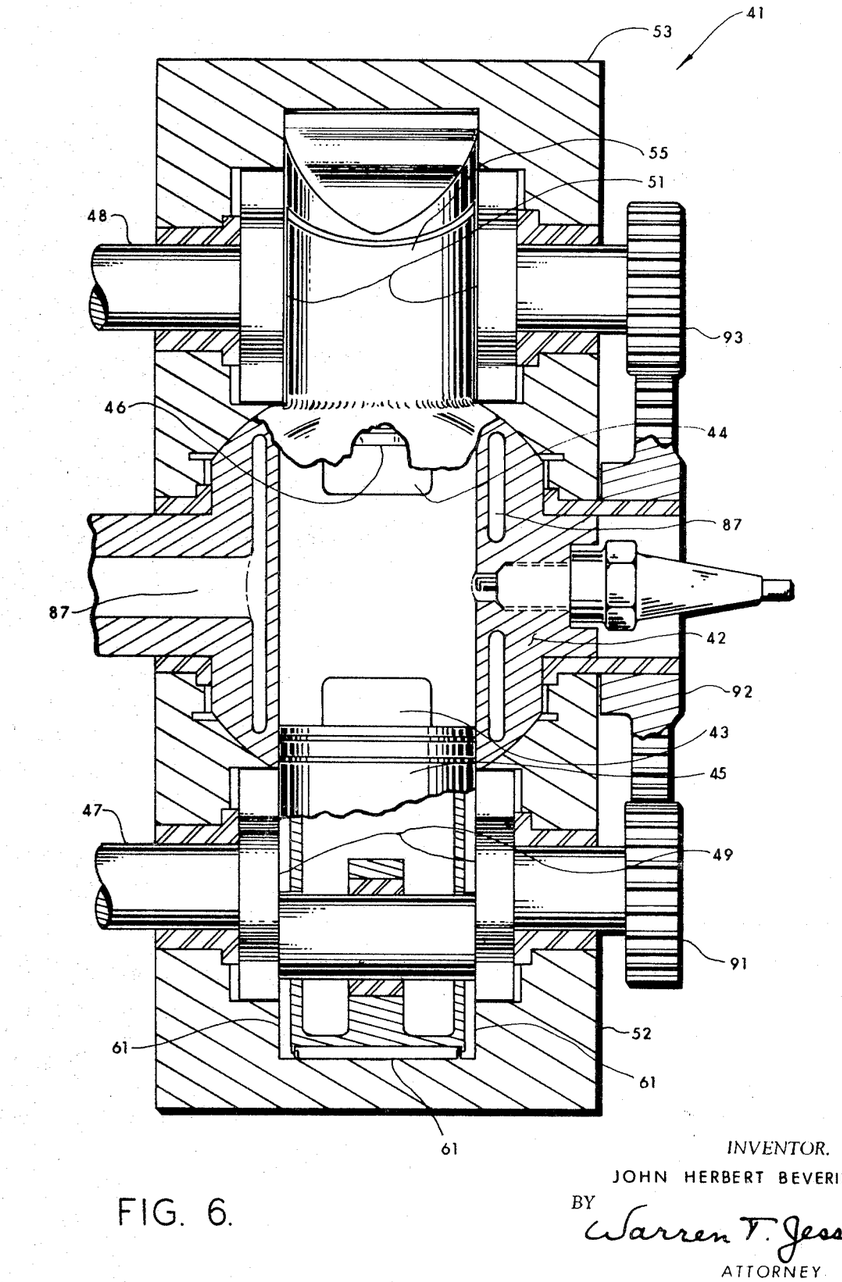
FIG. 6 is a section on line 6—6 of FIG. 5.

In FIGS. 5 and 6 there is shown a second embodiment, of the invention in the form of a two-cycle internal combustion engine. This engine, designated generally as 41, incorporates two opposed pistons in the same cylinder, and comprises a cylinder 42 having cylinder inlet port 43 and cylinder outlet port 44, which are periodically opened and closed by the reciprocating motion of their respective pistons 45 and 46. Rotatably mounted within each crankcase 52 and 53 are a pair of crankshafts 47 and 48, each crankshaft having full circular webs 49 and 51. These crankshaft webs 49 and 51 have their inner faces machined so that they are flush or aligned with the bore of the cylinder at its maximum dimension in a plane perpendicular to the axis of the crankshaft. The periphery of each web is machined to allow no more than a close clearance within its respective crankcases 52 and 53. The cylinder sleeve extends into each crankcase. These extensions 54 and 55 have machined flats 56 to prevent interference with the side walls of the crankcases and with the inner webs of the crankshafts 49 and 51. In addition, the cylinder sleeve extensions are slotted 57 to prevent interference with the crankpin portion of the crankshafts 47 and 48.

The pistons 45 and 46, pivotally connected to their respective crankshafts 47 and 48, form a close clearance with respect to the inner surfaces of the crankcase and crankshaft webs. The pistons are fitted with flexible sealing devices 61 and 62 which slide in rubbing contact with portions of the inner surface of the crankcases 52 and 53 and with the inner surfaces of the crankshaft webs 49 and 51. The flexible sealing members 61 and 62 constitute partition elements which together with the pistons 45 and 46 comprise partition means dividing their respective crankcase internal volumes into two parts.

One crankcase 52 is provided with a charge inlet port 81, and the other crankcase 53 is provided with an exhaust port 82. In communication with the charge inlet port 81 is a carburetor 83 and in communication with the exhaust port 82 is exhaust system 84. A short, small volume transfer passage 85 extends between the interior of the crankcase 52 and the cylinder inlet port 43. A similar transfer passage 86 extends between the cylinder outlet port 44 and the interior of the crankcase 53. Gears 91 and 93 attached to the crankshafts 47 and 48 mesh with gear 92 which synchronizes the crankshafts.

The operation of the opposed piston two-cycle internal combustion engine is similar to the single-cylinder, two-cycle internal combustion engine 20. The primary difference is that a more complete expansion of the working fluid is realized because of the expansion of the gases in the crankcase expansion volume of crankcase 53. Expansion of the exhaust gases continues throughout the normal scavenging period. Because of the more complete expansion, increased power is obtained wtihout additional fuel. Thus, a lower specific fuel consumption is obtained. Other features are minimum heat rejection to the coolant 87, very low mechanical loading of cylinder trunnion bearings, excellent mechanical balance and a significantly reduced exhaust noise level.

Figure 7:
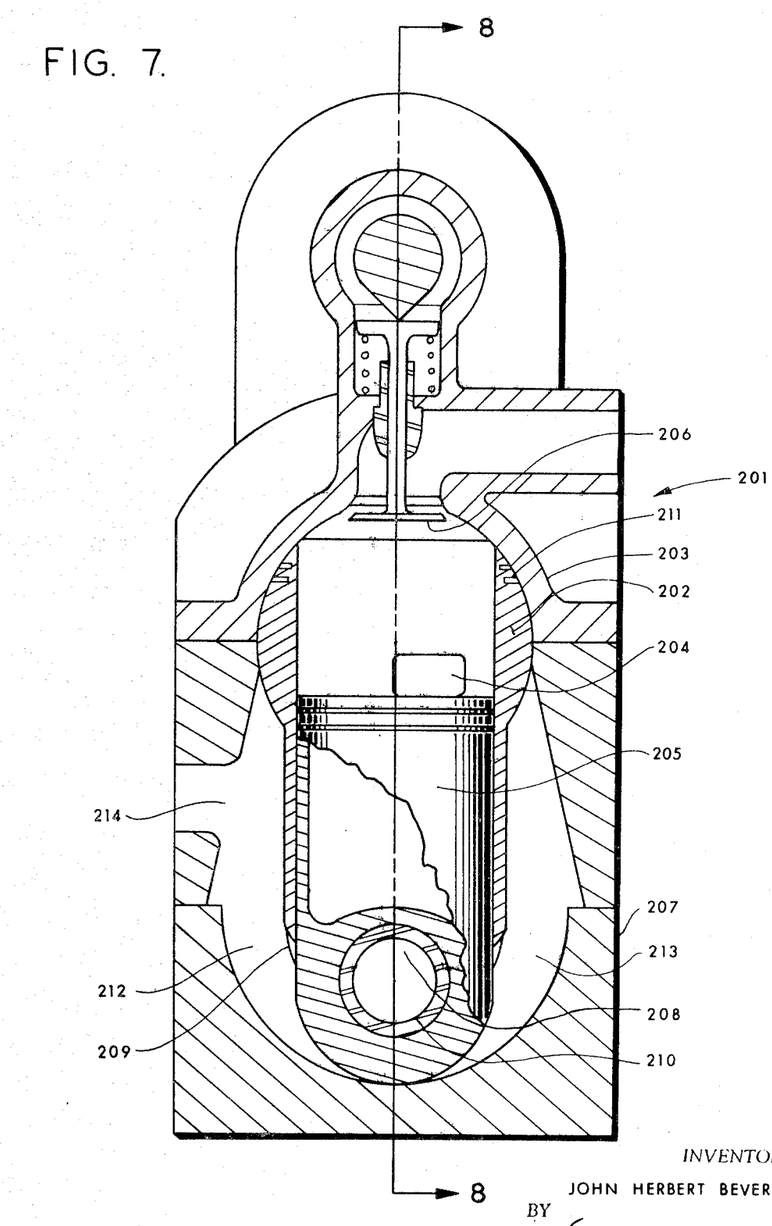
FIG. 7 is a longitudinal section of a single-cylinder, fuel-injected, two-cycle internal combustion engine in a plane perpendicular to the axis of the crankshaft and through the axis of the cylinder.
Figure 8:
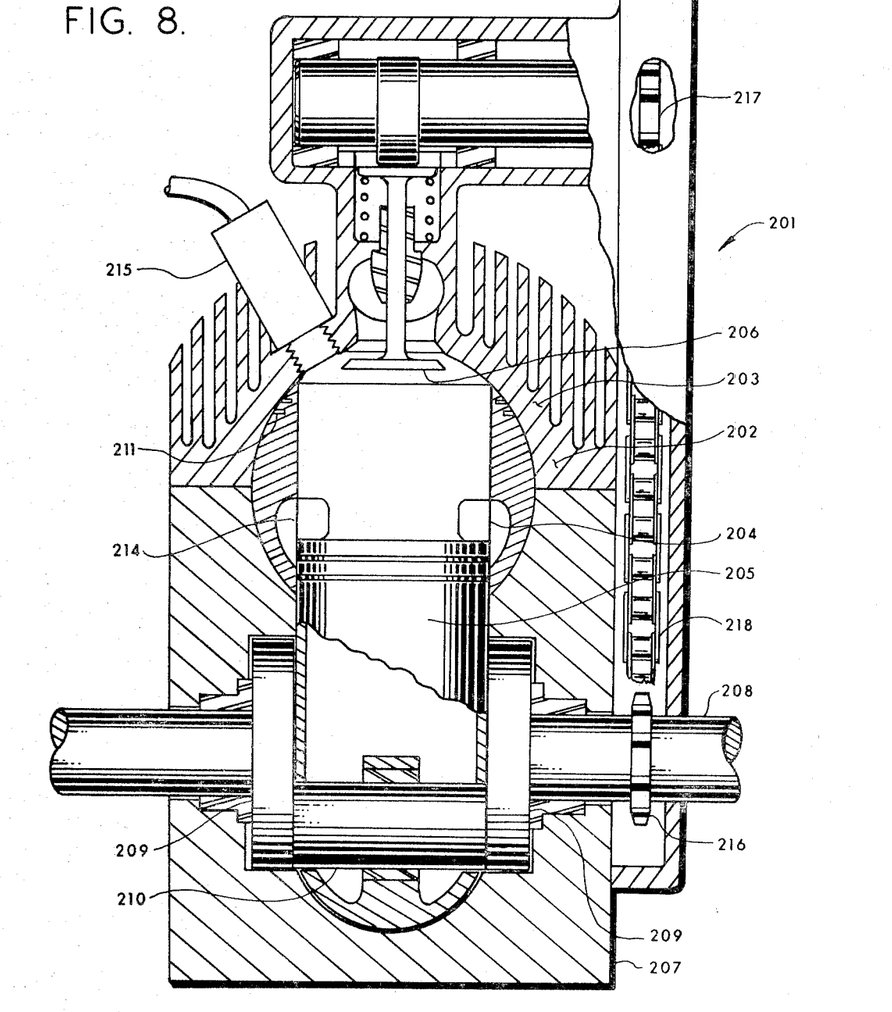
FIG. 8 is a section on line 8—8 of FIG. 7.

In FIGS. 7 and 8, there is shown a third embodiment of the invention in the form of a fuel-injected, two-cycle internal combustion engine. This engine, designated generally as 201, incorporates an open-ended oscillating cylinder 202 and a fixed cylinder head 203. The cylinder 202 has ports 204 which are periodically opened and closed by the reciprocating relative motion of the piston 205. The exhaust flow from the interior of the cylinder 202 above the piston 205 is controlled by the exhaust valve 206 mounted in the cylinder head 203. Rotatably mounted within the crankcase 207 is a crankshaft 208 having full circular webs 209 which have their inner faces machined so they are flush or aligned with the base of the cylinder at its maximum dimension in a plane perpendicular to the axis of the crankshaft and the webs have peripheries machined to allow no more than a close clearance with respect to the crankcase. The crankshaft rotates in a counterclockwise direction.

The cylinder 202 extends into the interior of the crankcase. Side clearance and slots are provided in the cylinder extension to prevent interference with webs 209 and crankpin 210 portions of the crankshaft 208. The cylinder 202 has sealing means 211 to prevent leakage of gases between the cylinder at the open end and the inner surface of the cylinder head 203.

The piston 205 pivotally connected to the crankshaft crankpin 210 forms a close clearance with respect to the crankshaft webs 209 and the inner surface of the crankcase 207, thereby dividing the interior of the crankcase into two mutually isolated chambers 212 and 213 during a portion of each revolution of the crankshaft 208. One chamber 212 is in communication with the air inlet port 214, and the other chamber 213 is in communication with the cylinder ports 204. Fuel is periodically supplied into the highly compressed air with the injector 215. Sprockets 216 and 217 and the timing chain 218 drive the exhaust valve actuation means and fuel injection means.

The operation of the engine 201 is similar to the single-cylinder, two-cycle internal combustion engine 20. The primary feature is the open-ended cylinder with low polar moment of inertia and conventional exhaust valving and fuel injection installations.

The same basic configuration of engine 201 can be operated as a more complete expansion four-cycle internal combustion engine by reversing the direction of crankshaft rotation and thus revising the direction of flow of working fluid through the engine and providing timing for the valve-in-head and fuel injection for four-cycle engine operation. For this configuration the chamber 213 alternately draws fresh air into the working cylinder via the open valve-in-head 206 and open cylinder ports 204 while the chamber 212 is discharging exhaust products via the crankcase port 214, and during the power cycle, chamber 213 more completely expands hot, higher pressure cylinder working fluid which flows from the cylinder via the cylinder ports 204, while chamber 212 discharges excess cool air via the crankcase port 214.

The features of the more complete expansion four-cycle engine are very low specific fuel consumption and good internal cooling provided by drawing fresh cool air through the engine on alternate revolutions of the crankshaft.

Figure 9:
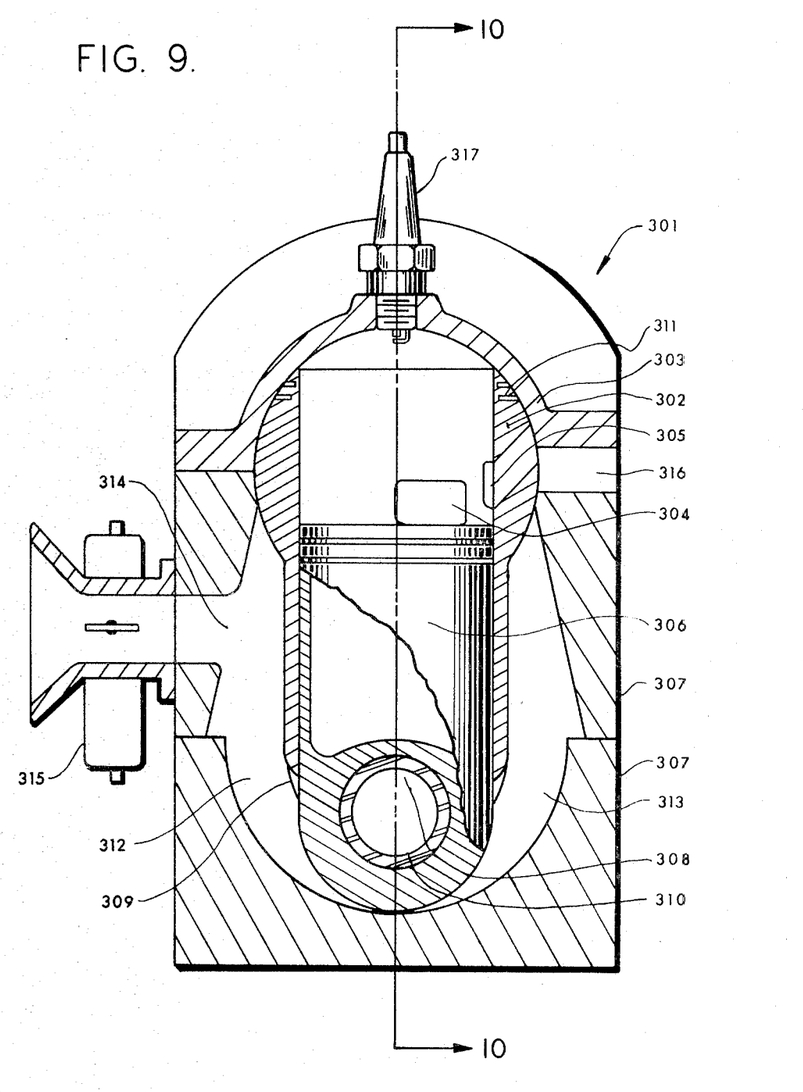
FIG. 9 is a longitudinal section of a single-cylinder, two-cycle internal combustion engine in a plane perpendicular to the axis of the crankshaft and through the axis of the cylinder.
Figure 10:
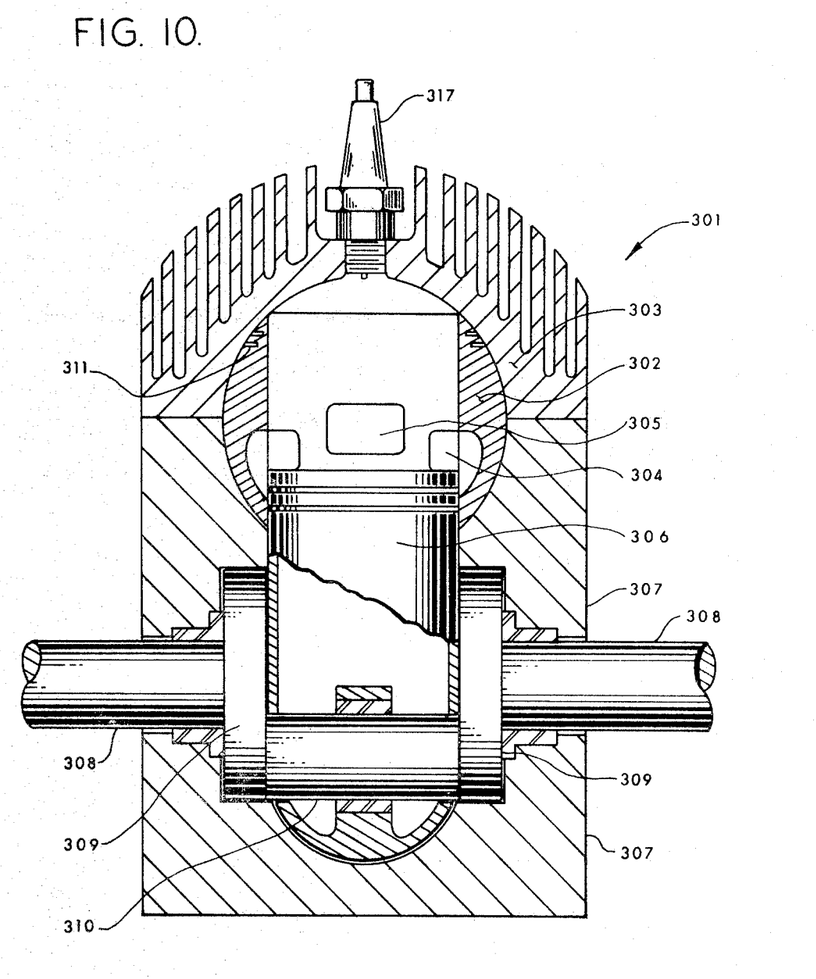
FIG. 10 is a section on line 10—10 of FIG. 9.

In FIGS. 9 and 10 there is shown a fourth embodiment of the invention in the form of a carbureted, spark ignition, two-cycle internal combustion engine. This engine, designated generally as 301, incorporates an open-ended oscillating cylinder 302, and a fixed cylinder head 303. The cylinder 302 has inlet ports 304 and exhaust port 305, which are periodically opened and closed by the reciprocating relative motion of the piston 306.

Rotatably mounted within the crankcase 307 is a crankshaft 308 having full circular webs which have their inner faces machined so they are flush or aligned with the bore of the cylinder at its maximum dimension in a plane perpendicular to the axis of the crankshaft and the webs have peripheries machined to allow no more than a close clearance with respect to the crankcase. The crankshaft rotates in a counterclockwise direction. The cylinder 302 extends into the interior of the crankcase. Side clearance and slots are provided to prevent interference with the webs 309 and crankpin 310 portions of the crankshaft 308. The cylinder 302 has sealing means 311 to prevent leakage of gases between the cylinder at its open end and the inner surface of the fixed cylinder head 303.

The piston 305, pivotally connected to the crankshaft crankpin 310, forms a close clearance with respect to the crankshaft webs 309 and the inner surface of the crankcase 307, thereby dividing the interior of the crankcase into two mutually isolated chambers 312 and 313 during each revolution of the crankshaft 308. One chamber 312 is in communication with the charge suction port 314 and the chamber 313 is in communication with the cylinder inlet ports 304. Carbureted fuel/air mixture is provided to the crankcase charge suction port 314 by the carburetor 315.

A short, small volume exhaust passage in the cylinder is periodically opened to the exhaust system 316 by the oscillating motion of the cylinder relative to the block 307 and cylinder head 303. The spark plug 317 is provided for ignition of compressed charge.

The operation of engine 301 is similar to the single-cylinder, two-cycle internal combustion engine 20. The primary feature is the open-end cylinder with low polar moment of inertia and the mechanically simple non-symmetrically timed exhaust system. This engine is capable of very high-speed operation. Thus, high-power output while having small overall size and great simplicity is accomplished.

Figure 11:
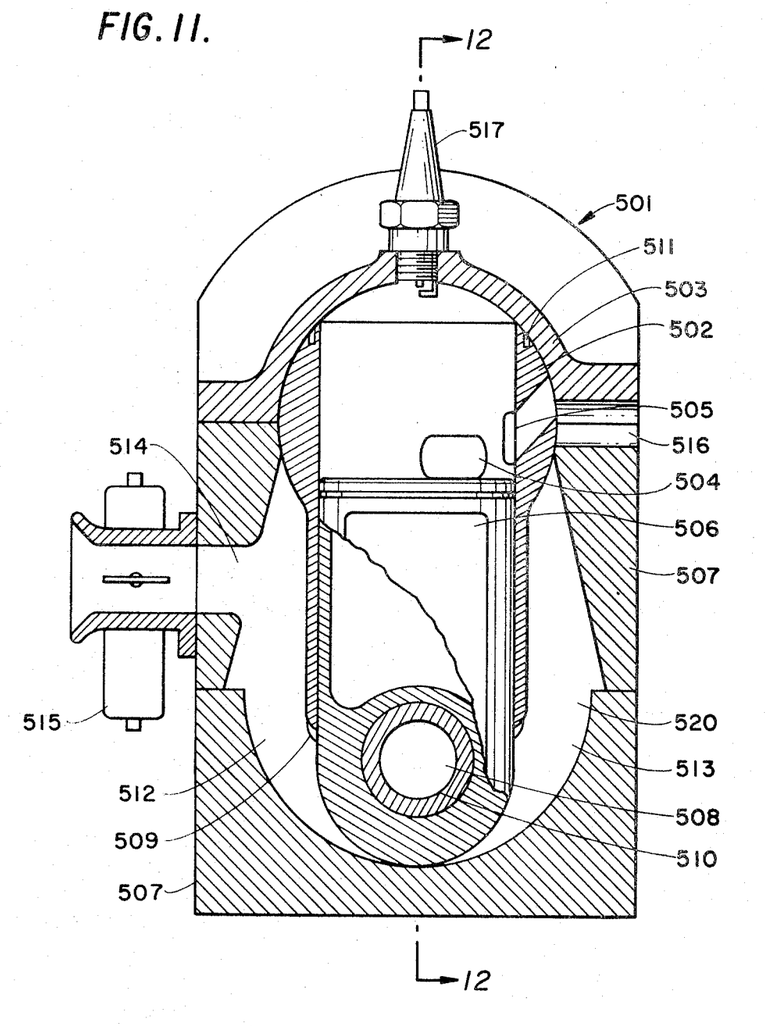
FIG. 11 is a cross-section of a further embodiment of the invention.
Figure 12:
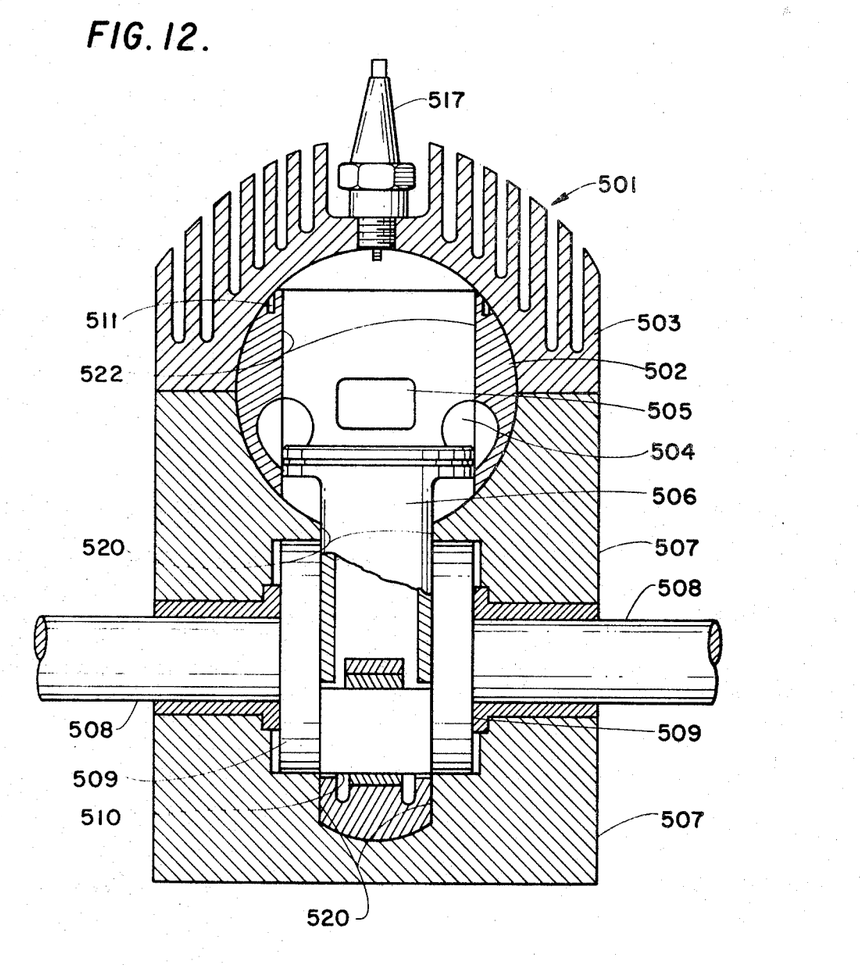
FIG. 12 is a longitudinal section on line 12—12 of FIG. 11.

In FIG. 11 and FIG. 12 there is shown a fifth embodiment of the invention in the form of a carbureted, spark ignition, two-cycle internal combustion engine. This engine, designated generally as 501 in FIG. 11 and FIG. 12, incorporates a crankcase more narrow in width as compared with the cylinder bore. Reduction of crankcase width allows reduction of the span between main bearings and the length of the crankpin. Thus, the stiffness of the engine crankshaft is enhanced and reduction of crankpin and counterweight masses are possible. Some reduction of crankcase pumping capacity relative to the piston displacement is incurred; however, this reduction of crankcase pumping capacity can be offset by increasing the engine stroke-to-bore ratio.

The engine 501 incorporates an open-ended cylinder 502 and a fixed cylinder head 503. The cylinder 502 has inlet ports 504 and exhaust port 505 which are opened and closed by the reciprocating motion of the piston 506.

Rotatably mounted within the crankcase 507 is a crankshaft 508 having full circular webs aligned with the crankcase sides 520 which have a width different from the cylinder bore 522. The cylinder 502 extends down into the interior of the crankcase. Side clearance is provided to prevent interference with the webs 509. The cylinder 502 has sealing means 511 to prevent leakage of gases between the cylinder at its open end and the inner surface of the fixed cylinder head 503.

The piston 505, pivotally connected to the crankshaft crankpin 510 forms a close clearance with respect to the crankshaft webs 509 and the inner surface of the crankcase 507, thereby dividing the interior of the crankcase with two mutually isolated chambers 512 and 513 during each revolution of the crankshaft 508. Chamber 512 is in communication with the charge suction port 514, and chamber 513 is in communication with the cylinder inlet ports 504. Carbureter fuel-air mixture is provided to the crankcase suction port by the carbureter 515.

A short, small volume exhaust passage in the cylinder is periodically opened to the exhaust system 516 by the oscillating motion of the cylinder relative to the block 507 and the cylinder head 503. Spark plug 517 is provided for ignition of the compressed charge.

The operation of the engine 501 is similar to the single-cylinder, two-cycle internal combustion engine 20. The primary feature is the relatively narrow, robust crankshaft essential for a very high-speed, high-power internal combustion engine.

What is claimed is:
1. Apparatus of the class described, comprising:
   a block member having a first portion forming a cylinder supporting means and a second portion forming a crankcase;
   a cylinder pivotally mounted in said first portion of said block member;
   a crankshaft rotatably mounted in said second portion of said block member;
   a piston directly mounted on said crankshaft and extending into said cylinder to move reciprocally with respect thereto upon rotation of said crankshaft, the extremity of said piston remote from said cylinder forming a close clearance with the inner surface of said crankcase during a portion of each revolution of said crankshaft;
   a sleeve surrounding said piston and extending down into the interior of said crankcase,
   a pair of webs mounted on said crankshaft on opposite sides of said piston to from a crank chamber within said crankcase, said piston forming a partition means dividing said crank chamber into two mutually isolated chambers during a portion of each revolution of said crankshaft.

2. Apparatus of the class described, comprising:

a block member having a first portion forming a cylinder supporting means and having a second portion forming a crankcase;

a cylinder pivotally mounted in said first portion of said block member;

a crankshaft rotatably mounted in said second portion of said block member;

a piston directly mounted on said crankshaft and extending into said cylinder to move reciprocally with respect thereto upon rotation of said crankshaft, the extremity of said piston remote from said cylinder forming a close clearance with the inner surface of said crankcase during a portion of each revolution of said crankshaft, so that said piston serves to complete a partition means which divides the interior of said crankcase into two mutually isolated chambers during a portion of each revolution of said crankshaft, said cylinder defining a cylinder chamber above the piston, and said cylinder having inlet and exhaust ports formed therein which are opened and closed by the reciprocal movement of said piston in said cylinder, said cylinder defining a first exhaust passage adjacent said exhaust port, and said block member defining a second exhaust passage adjacent said first exhaust passage in which said first exhaust passage is periodically opened and closed to said second exhaust passage by the pivotal movement of said cylinder relative to said block member.

References Cited

UNITED STATES PATENTS

| | | | |
|---|---|---|---|
| 990,326 | 4/1911 | Woolery | 123—42 |
| 1,709,652 | 4/1929 | Bennett | 123—42 |
| 2,317,772 | 4/1943 | Huber et al. | 123—73 A |
| 2,844,131 | 7/1958 | Beveridge | 123—73 A |

FOREIGN PATENTS

| | | | |
|---|---|---|---|
| 160,770 | 3/1920 | Great Britain | 123—42 |
| 96,232 | 9/1922 | Switzerland | 123—42 |

ALLAN D. HERRTANN, Primary Examiner

U.S. Cl. X.R.

91—210; 92—118; 123—42, 73 A